United States Patent [19]

Sakakibara et al.

[11] Patent Number: 4,898,568
[45] Date of Patent: Feb. 6, 1990

[54] ENDLESS TRANSMISSION BELT

[75] Inventors: Shiro Sakakibara, Aichi; Yoshiaki Kano, Gifu; Yoshinori Miyaishi, Aichi, all of Japan

[73] Assignee: Aisin Aw Kabushiki Kaisha, Japan

[21] Appl. No.: 287,323

[22] Filed: Dec. 21, 1988

[30] Foreign Application Priority Data

Dec. 29, 1987 [JP] Japan .................................. 62-335988

[51] Int. Cl.$^4$ .............................................. F16G 1/24
[52] U.S. Cl. .................................................... 474/245
[58] Field of Search .............. 474/242, 240, 244, 245, 474/201, 237

[56] References Cited

U.S. PATENT DOCUMENTS

| 4,512,754 | 4/1985 | Cole, Jr. et al. | 474/245 |
| 4,737,137 | 4/1988 | Miyaishi | 474/245 |
| 4,753,627 | 6/1988 | Kawamoto | 474/18 |

*Primary Examiner*—Thuy M. Bui
*Attorney, Agent, or Firm*—Lorusso & Loud

[57] ABSTRACT

An endless transmission belt for use in continuously variable transmissions of the chain type with a number of link plates interconnected in an endless manner. The belt has blocks spaced along the length of the belt, pins spaced along the length of the belt and engaging the blocks, and link plates arranged in sets and pins, each of the link plates having a single opening formed therein. A plurality of sets of the link plates are interconnected by the pins in an endless manner. Each link plate has horizontal portions formed in such a manner as to continue with the side end faces, thereby defining the opening, via rounded portions for contacting the pins, and first and second notches are respectively formed in the upper and lower interior edges of the horizontal portions partially defining the opening. By virtue of this arrangement, stress received by the end faces of the rounded portions of each link plate is dispersed, thereby reducing the concentration of stress in any particular portions of the link plate.

3 Claims, 7 Drawing Sheets

Fig. 3 (PRIOR ART)
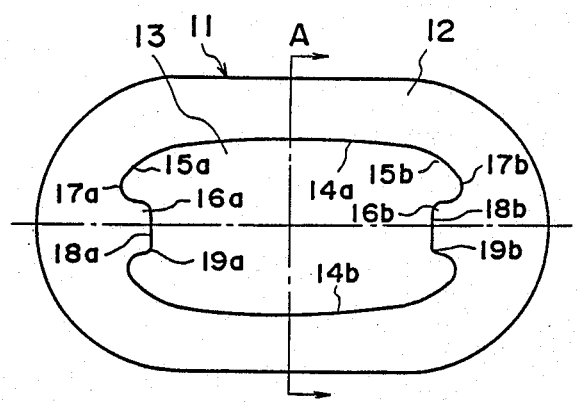
Fig. 4 (PRIOR ART)
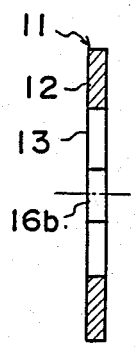
Fig. 5 (PRIOR ART)
Fig. 6 (PRIOR ART)
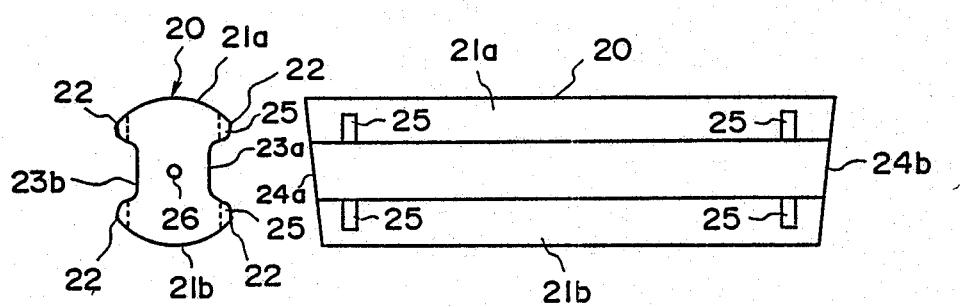
Fig. 7 (PRIOR ART)
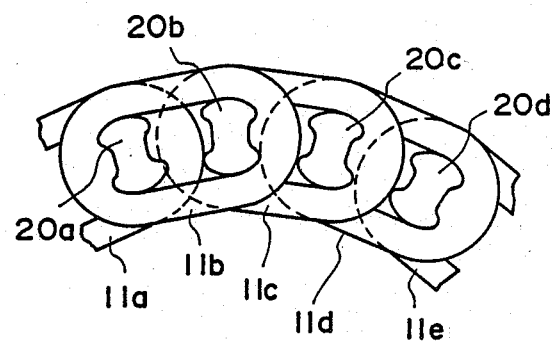
Fig. 8 (PRIOR ART)
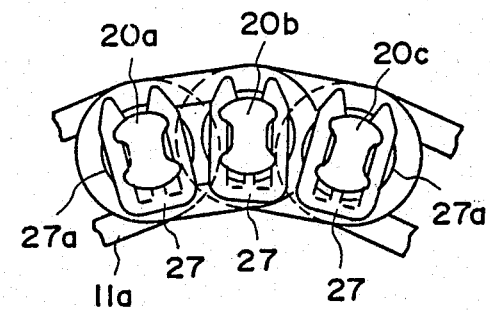

ENDLESS TRANSMISSION BELT

BACKGROUND OF THE INVENTION

The present invention relates to endless transmission belts and, in particular, to endless belts for use in continuously variable transmissions of the chain type in which a number of link plates are interconnected in an endless manner.

One example of a conventional endless transmission belt of the above-mentioned type is disclosed in Japanese Pat. Laid-Open No. 99143/1984. According to this disclosure, link plates of the roller chain and the chain belt are each formed with two pin holes, and a number of such link plates are alternately overlapped each other and interconnected by pins in an endless manner.

The construction of the conventional endless transmission belt will be described with reference to FIGS. 1 and 2.

As shown in FIG. 1, a transmission chain 1 has sets 2 of link plates 3 in which the link plates 3 alternately overlap each other and are interconnected by round pins (joint members) 4. Each of the round pins 4 is received in the group of aligned openings 5 of the alternately overlapped link plates 3. Holding clips 6 are used to hold the round pins 4 in place.

As shown in FIG. 2, the holding clips 6 are formed out of a metal or plastic material and have a generally C-shaped configuration. When installed, the clips 6 expand into a dimension corresponding to the width of the chain at positions where the round pins 4 form joints. Each clip 6 has a generally linear back portion 7 provided at the center thereof and has a sufficient length to extend across the full width of two sets 2 of alternately overlapped link plates 3. Each holding clip 6 also has a pair of arms 8, each extending from its one end perpendicularly with respect to the back portion 7 and in parallel with respect to the outermost link plates 3 of the two sets 2. Each arm 8 has a free end 9 which engages either the round pin 4 through the sets 2 of link plates 3 or the outer surface of the outermost link plate 3.

A second example of the prior art is disclosed in Japanese patent publication No. 53227/1983 in which link plates are each formed with a single opening and are provided with rotation preventing projecting portions or transitional (recess) portions.

The construction of the second example of the prior art will be described with reference to FIGS. 3 through 11.

Referring to these figures, each link element 11 has a web 12 and an opening 13, the opening 13 being defined by two longitudinal sides 14a and 14b, and vertical sides 15a and 15b joining the longitudinal sides 14a and 14b. The vertical sides 15a and 15b have projections 16a and 16b, respectively, which project toward the center of the opening 13. Each of the projections 16a and 16b connects with the longitudinal sides 14a and 14b via transitional portions 17a and 17b. The link element 11 also has link rolling contact surfaces 18a and 18b, and corners 19a and 19b at the projections 16a and 16b. Pins 20, which cooperate with the link elements 11, each have two head surfaces 21a and 21b which continue, via curved transitional portions 22, with two parallel surfaces 23a and 23b extending longitudinally of the pin 20. The end faces 24a and 24b of each pin 20 are flat, and slots 25 are formed in the transitional portions 22 in the vicinity of these end faces. The slots 25 receive circlips 27 which retain the link elements 11 via washers 27a.

In the transmission chain for use in a transmission having conical pulleys, a plurality of link elements 11, each receiving two pins 20, are linked by pins 20 which extend perpendicular to the faces of the link elements 11 through the openings 13 of the link elements 11. The end faces 24a and 24b of the pins 20 act as frictional surfaces and thus cooperate with the conical surfaces of the conical discs. The parallel surfaces 23a and 23b extending longitudinally of the pins 20 are in rolling contact with the link elements 11, and these parallel surfaces 23a and 23b have a radius of curvature different from that of the rolling contact surfaces 18a and 18b of the link elements 11 which cooperate therewith.

The zone of contact between the vertical sides 15a and 15b defining the opening 13 of each link element 11 and the corresponding parallel surface 23a and 23b of the pin 20 are shorter than the vertical sides 15a and 15b, and that zone is offset, by the transitional portions 17a and 17b of the vertical sides, in the longitudinal direction of the link element 11.

As shown in FIGS. 7 and 8, the link elements 11 are disposed around the pins 20 in a staggered pattern whereby pins 20a to 20d are allowed to cooperate with links 11a to 11e. Specifically, as shown in FIG. 9, links 11f and 11g in the first row engage with pins 20c and 20d at one position, and with pins 20f and 20g at another position. The links in the second row are shifted from the links in the first row in such a manner that a link 11h engages with pins 20a and 20b, a link 11i engages with the pins 20d and 20e, and a link 11j engages with the pin 20g and an adjacent pin (not shown). In the next two rows adjacent to each other, links 11k and 11l engage with the pins 20b and 20c, while links 11m and 11n engage with the pins 20e and 20f. In the following row formed by links 11o, 11p, and 11q, the links are arranged in the same manner as in the second row formed, by the links 11h, 11i, and 11j. In the next two adjacent rows, links 11r and 11t, and links 11s and 11u are arranged in the same manner as the links 11f and 11g in the first row.

FIG. 10 shows the angular orientation of a pin 201 before it enters the pulley between the conical pulley faces. In this state, the axial center 25a of the pin 201 is not yet held between the conical faces, and the lower corner 19c of one projection 16c of the link element 11 is in contact with the lower edge of the flat side surface 23c of the pin 201.

FIG. 11 shows the angular orientation of the pin 201 in which it is gradually coming into contact with the conical pulley. In this state, the upper corner 19d of the projection 16c of the link element 11 is in contact with the upper edge 23d of the surface 23c of the pin 201.

With the first example of the prior art in which, as shown in FIG. 12, a link plate 28 is formed with two pin holes 29, when tensile load F is applied, the portions denoted at Z are deformed outwardly, but the portion X having a relatively high rigidity undergoes substantially no deformation. Consequently, a large moment acts on the portions Y, resulting in the generation of high tensile stress at portions Y1. In this way, excessive stress is concentrated in the vicinity of the upper and lower portions of the two pin holes 29, thereby rendering the conventional belt unable to transmit very large torque.

In contrast, with the construction shown in FIG. 13, in which a link plate 30 is formed with a single opening 31, when tensile load F is applied, the side portions 32 of the link plate 30 are deformed outwardly, and, as this deformation proceeds, the upper and lower edge portions 33 and 34 having a relatively low rigidity are deformed inwardly. Consequently, bending moment at the corner portions 35 and 36 is reduced, and the tensile stress applied to the end faces 37 and 38 at these corners is also reduced.

With the second example of the prior art in FIG. 3, however, concentration of excessive stress occurs at the projections 16a and 16b of the link elements 11 or at the transitional portions 17a and 17b on the sides of the link elements 11, thereby rendering the endless transmission belt unable to transmit large torque.

The link elements 11 are usually formed by stamping them. During stamping, however, broken surfaces tend to be formed in the projections 16a and 16b, the transitional portions 17a and 17b, and portions in the vicinity of these portions of the link elements 11, because the aforementioned portions are relatively narrow and small. Such broken surfaces may often lead to breakage of the link elements 11 as well as to curtailed life of the stamping die, thereby causing an increase in production cost of the link plates.

SUMMARY OF THE INVENTION

An object of the present invention is to provide an endless transmission belt which reduces the concentration of stress in any particular portions of the link plates, thereby improving the durability of the belt, and also provides smooth rolling movement of the link plates.

In order to achieve the above-stated object, according to the present invention, an endless transmission belt is provided which includes: blocks mounted along the length of the belt; pins spaced along the length of the belt and engaging the blocks; and plural sets of link plates engaged by the pins, each of the link plates having a single opening formed therein to allow the link plates to be interconnected by pins in an endless manner. The link plates are defined by: horizontal portions formed in such a manner as to continue with the side end faces to partially define the opening via rounded portions for contacting the pins; a first notch formed in the upper longitudinal end face partially defining the opening; and a second notch formed in the lower longitudinal end face partially defining the opening, whereby stress applied to the end faces of the rounded portions of each link plate is dispersed.

With the above-described arrangement in accordance with the present invention, the small projections and narrow transitional portions, which characterize the prior art, are avoided in the link plates, i.e. on the sides of the openings in the link plates, and accordingly, the link plates have gently and smoothly curved surfaces. In addition, the upper and lower longitudinal end faces partially defining the opening of each link plate are formed with first and second notches, respectively. By virtue of these features, (1) The bending moment applied to the corner end faces consisting of rounded portions of the opening of each link plate is greatly reduced, and, in addition, the stress applied to these end faces at the corners of the opening is effectively dispersed. Consequently, it is possible to reduce the concentration of stress and, hence, to improve the torque capacity, i.e., the durability of the belt.

(2) It is possible to prevent the formation of any broken surfaces during stamping. Consequently, it is possible to improve the torque capacity, i.e., the durability of the belt.

(3) It is possible to prolong the life of link plate stamping dies, thereby achieving a reduction in production cost of the link plates.

(4) If the configuration of the outer side of the link plates are suitably selected to minimize the extended height of sets of link plates when the belt is bent or to avoid any contact between link plates in adjacent sets when the belt is bent, it is possible to achieve smooth rolling movement of the link plates.

BRIEF DESCRIPTION OF THE DRAWINGS

FIG. 3 is a side view of a link element, showing a second example of the prior art;

FIG. 4 is a sectional view taken along the line A—A shown in FIG. 3;

FIG. 5 is a side view of a hinge pin fitted through the link element;

FIG. 6 is a view showing the end faces of the hinge pin;

FIG. 7 is a side view showing a number of links and pins combined into a transmission chain;

FIG. 8 is a side view showing a state in which circlips engage with the end portions of the pins shown in FIG. 7;

DESCRIPTION OF THE PREFERRED EMBODIMENT

An embodiment of the present invention will now be described in detail with reference to the drawings.

Figure 14:
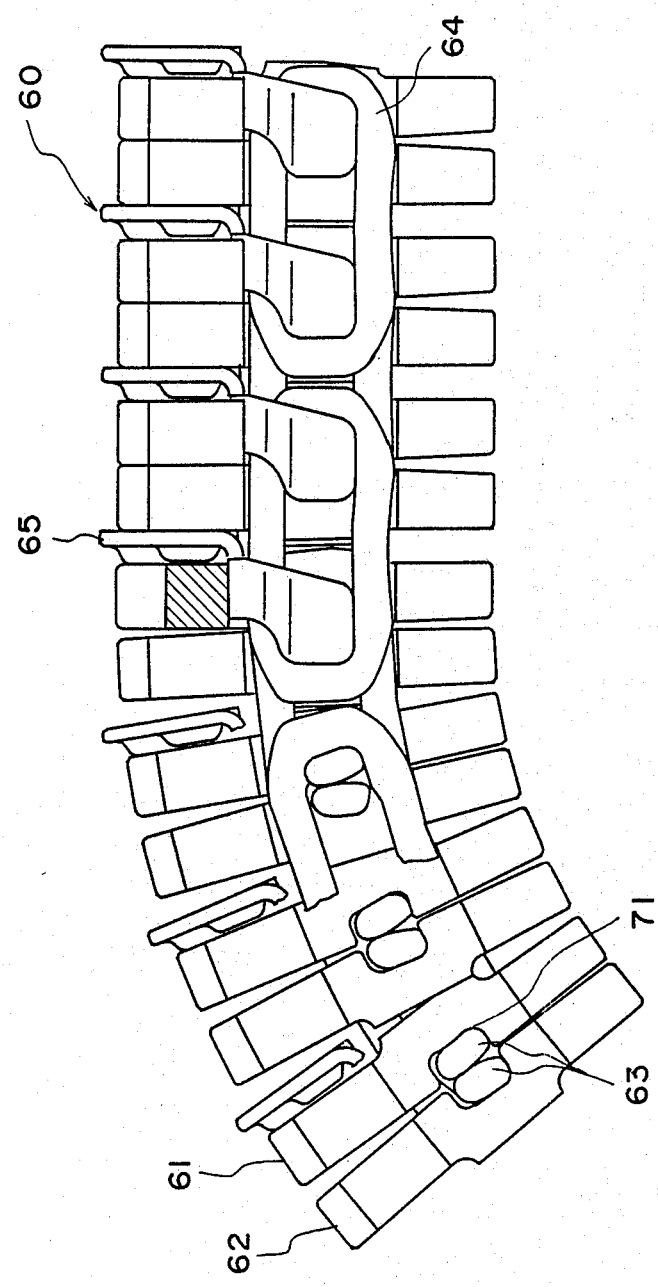
FIG. 14 is a partially cutaway side view of an endless transmission belt, showing an embodiment of the present invention.
Figure 15:
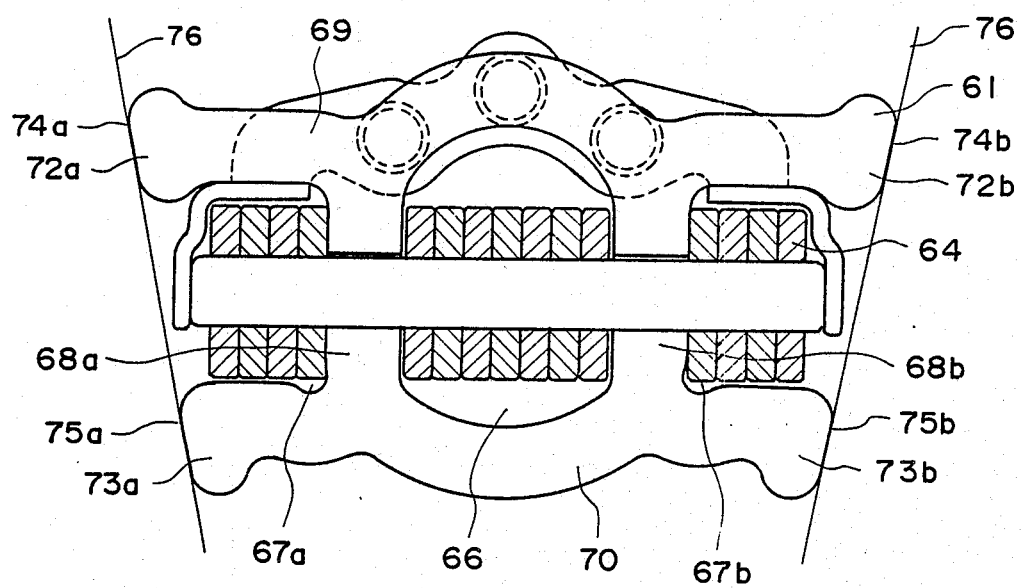
FIG. 15 is a view showing a section through the endless transmission belt shown in FIG. 14.

As shown in FIGS. 14 and 15, an endless transmission belt 60 has first block members 61, second block members 62, link plates 64 linking these block members 61 and 62, pins 63 engaging with the link plates 64, and retainers 65 provided for positioning the first and second block members 61 and 62 and sets of link plates 64, while preventing the string vibration of straight portions of the belt as well as the drop-off of the pins 63.

The structure of these components will be described below.

As shown in FIG. 15, each first block member 61 has a generally trapezoidal configuration when viewed from the front, and includes an opening 66 in the center, notch portions 67a and 67b on either side of the opening 66, columns 68a and 68b, an upper span portion 69, and a lower span portion 70. Enlarged portions 72a and 72b are formed on the two ends of the upper span portion 69, while enlarged portions 73a and 73b are formed on the two ends of the lower span portion 70. The end faces 74a and 74b of the enlarged portions 72a and 72b and the end faces 75a and 75b of the enlarged portions 73a and 73b form surfaces of contact with the driving pulley and the driven pulley, and are positioned on contact planes 76 to come into smooth contact with the pulleys. Thus, each first block member 61 has a generally trapezoidal front configuration. The columns 68a and 68b of the first block members 61 have pin engagement grooves 71 (see FIG. 14). Each groove 71 is formed in a middle portion of one of the front-side and back-side surfaces of the columns 68a and 68b.

Each of the second block members 62 has the same configuration as the first block member 61. Each second block member 62 is paired a first block member 61, with the pin engagement grooves 71 facing each other.

The link plates 64 form sets. Two sets adjacent in the longitudinal direction of the belt have their link plates intermeshed. As shown in FIG. 15, seven link plates are disposed in the openings 66 while eight link plates in total are disposed in the notch portions 67a and 67b on either sides of the openings 66, that is, fifteen link plates in total are overlapped in the a direction transverse to the belt, thereby forming each link set. Detailed description of the link plates 64 will be given later.

Figure 19A:
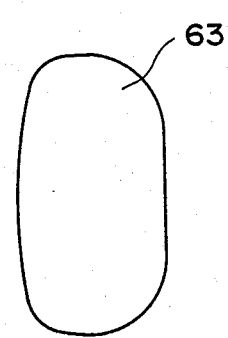
FIGS. 19 (a) and (b) are views showing the structure of pins of the endless transmission belt shown in FIG. 14.
Figure 19B:
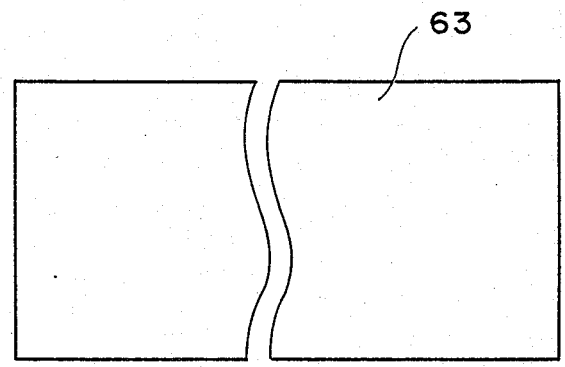

Each of the pins 63 has a cocoon-shaped cross-section, as shown in FIG. 19 (a), and it is bar-shaped, as shown in FIG. 19 (b). The pins 63 are paired, each pair comprising two pins 63 received together in the pin engagement grooves 71 of the first and second block members 61 and 62, and engaged the sets of link plates 64.

Next, detailed descriptions will be given concerning the structure of the link plates 64 used in the present invention.

Figure 16:
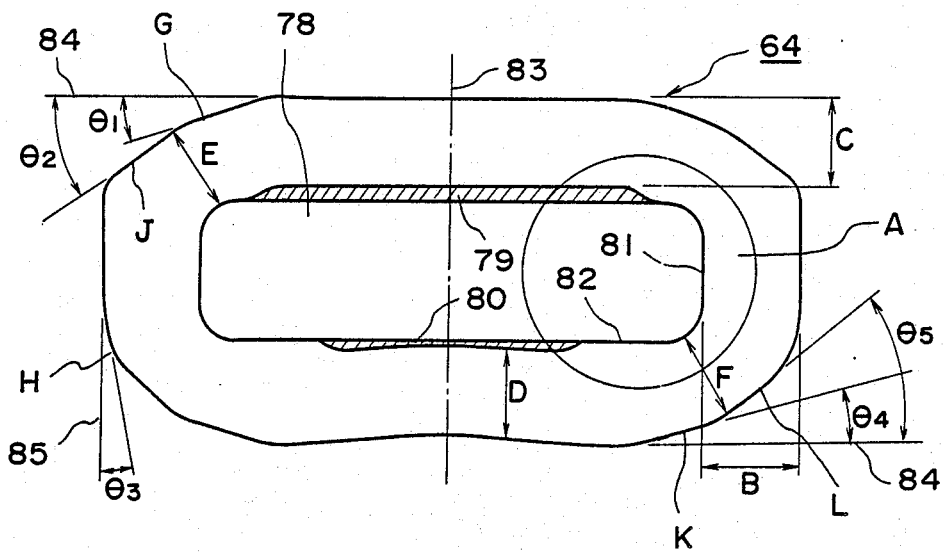
FIG. 16 is a front view of a link plate of the endless transmission belt shown in FIG. 14.
Figure 17:
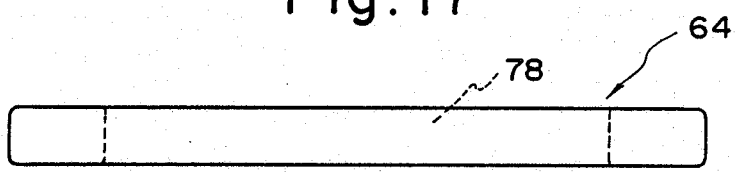
FIG. 17 is a side view of the link plate.
Figure 18:
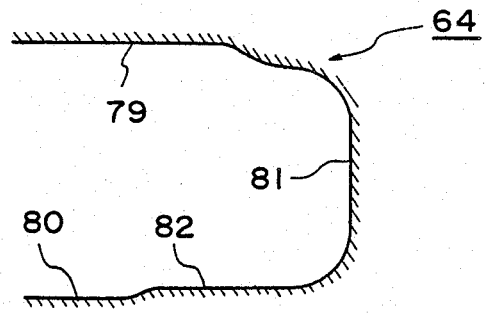
FIG. 18 is an enlarged view of the part A shown in FIG. 16.

As shown in FIG. 16, each of the link plates 64 has a single opening 78 having a generally rectangular configuration. In order to reduce the concentration of stress, the upper end face longitudinally extending and partially defining the opening 78 is formed with a first notch 79, while the lower end face longitudinally extending and partially defining the opening 78 is formed with a second notch 80. Each link plate 64 also has side end faces 81 which have a configuration corresponding to the cross-sectional configuration of the pins 63 (see FIG. 19 (a)) for contact with the pins 63, and horizontal portions 82 continuing with the side end portions 81 via corners. The configuration of the opening 78 is symmetrical with respect to the center line 83 of the link plate 64.

Figure 1:
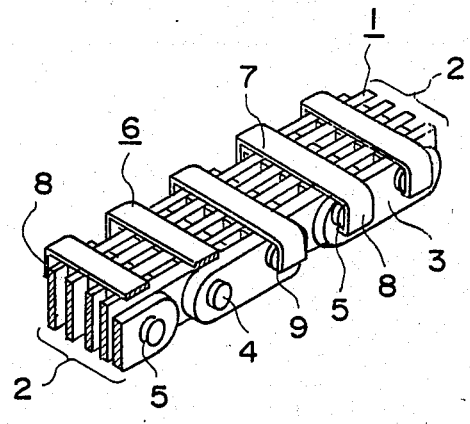
FIG. 1 is a fragmentary perspective view of an endless transmission showing a first example of the prior art.
Figure 2:
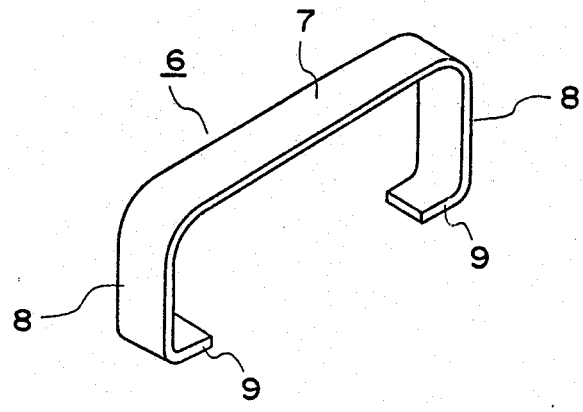
FIG. 2 is a perspective view of a holding clip of the endless transmission belt shown in FIG. 1.
Figure 9:
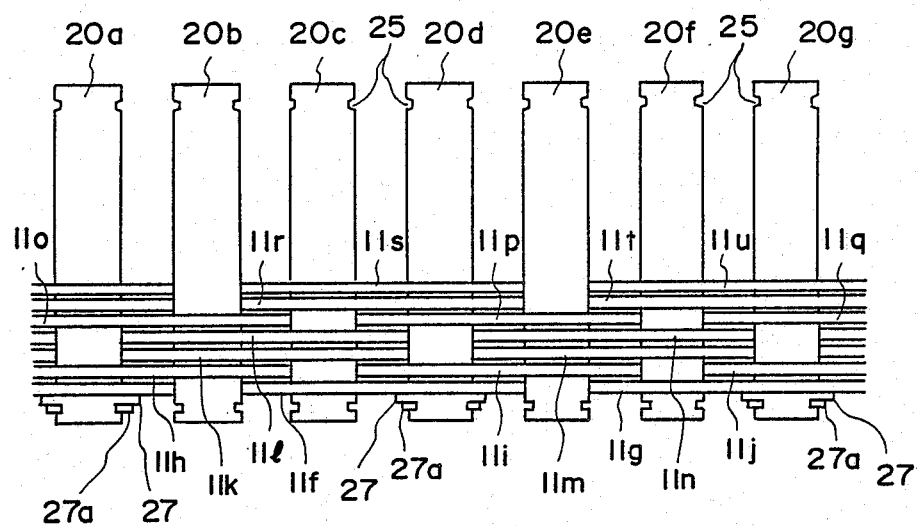
FIG. 9 is a fragmentary plan view of the transmission chain.
Figure 10:
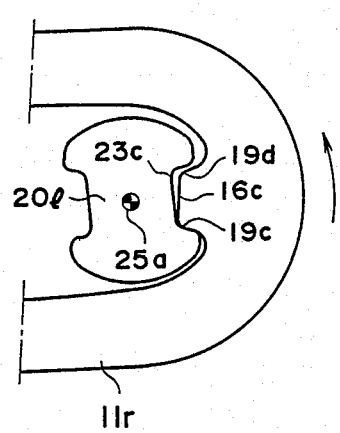
FIGS. 10 and 11 are views used to explain the rolling movement of the pins on link surfaces cooperating therewith.
Figure 11:
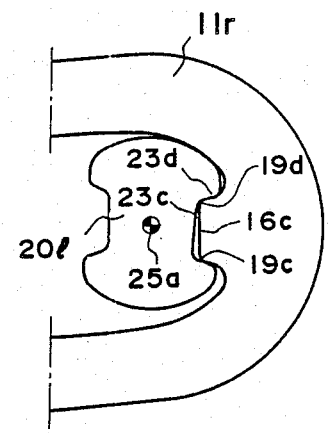
Figure 12:
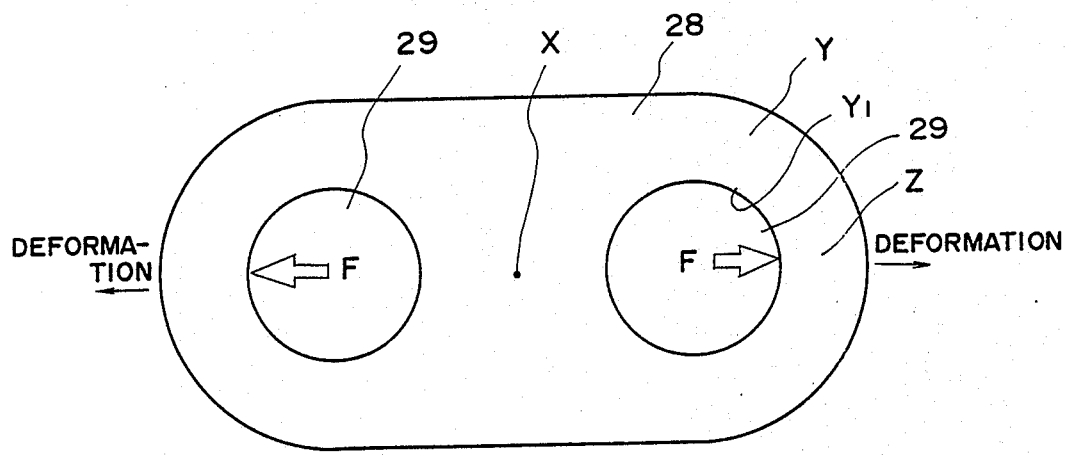
FIG. 12 is a view used to explain stress applied to the conventional link plate.
Figure 13:
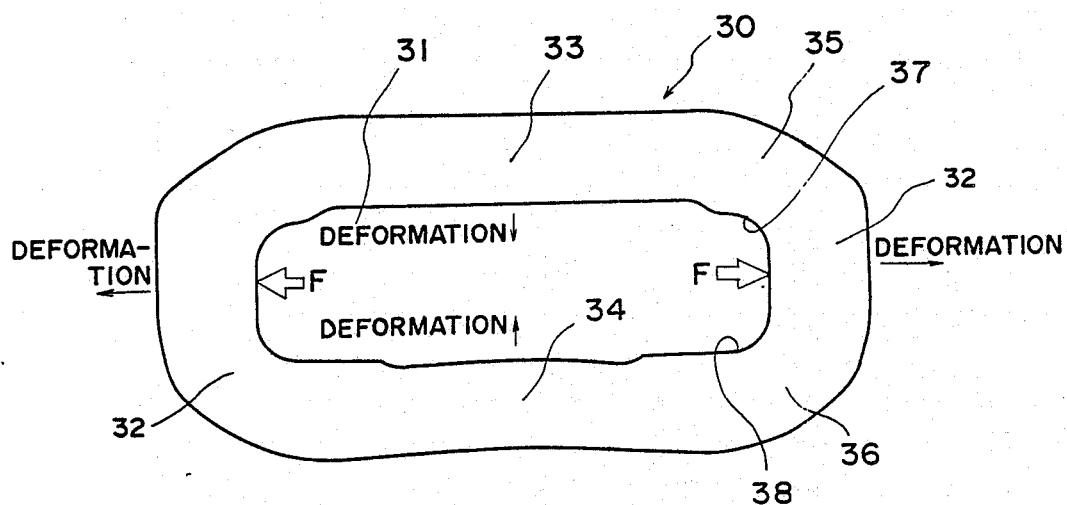
FIG. 13 is a view used to explain stress applied to a link plate used in the present invention.

The body of each link plate 64 has a substantially constant width around the opening 78 the height of which is determined in accordance with the width of the pins 63 received therein. The width B is slightly larger than any of the widths C, D, E and F. First sloping faces G and J are formed in order to reduce stress received by the corner portions (such as those denoted at 35 in FIG. 13), and these faces are tapered at angles $\theta_1$ and $\theta_2$, respectively, relative to the horizontal line 84. Also, a third face H is formed in order to prevent the link plate from coming into contact with a link plate in an adjacent link set when the link sets are pivoted and this face slopes at an angle $\theta_3$ relative to the vertical line 85. Further, second faces K and L are formed in order to reduce stress received by the corner portions 36, and these faces form tapers at angles of $\theta_4$ and $\theta_5$, respectively relative to the horizontal line 84.

By virtue of the above-described structure, when each link plate 64 is subjected to tensile load, the side portions 32 (in FIG. 13) are deformed outwardly. Since the upper and lower edge portions 33 and 34 have low rigidity because of notches 79 and 80, these edge portions 33 and 34 are easily deformed inwardly by the deformation of the side portions 32. Consequently, it is possible to reduce the stress occurring at corner portions 35 and 36 and, hence, to reduce the concentrated stress on the end faces 37 and 38 at these corner portions.

Further, according to the present invention, certain arrangements are made in order to minimize the height of the link sets on the of the link plates 64 when the link sets are pivoted, and to avoid any contact between link plates in two adjacent link sets when the link sets pivot. As a result, the link plates 64 perform with smooth rolling movement.

The present invention is not limited to the above described embodiments: other various modifications based on the spirit of the present invention are possible and they are not excluded from the scope of the present invention.

What we claim is;

1. An endless transmission belt including blocks and pins spaced along its length, link plates arranged in sets of parallel members, each of said link plates having a single opening formed therein, plural sets of said link plates being interconnected by said pins in an endless manner, each of said link plates comprising:
   (a) upper and lower horizontal portions and side end faces defining a central opening, said horizontal portions joining said side end faces via rounded portions for contacting said pins;
   (b) a first notch formed in the upper horizontal portion and partially defining said opening; and
   (c) a second notch formed in the lower horizontal portion and partially defining said opening,
   whereby stress received by said rounded portions at the top and the bottom of the side end faces is dispersed.

2. An endless transmission belt according to claim 1, wherein the outer edges of each of said link plates has first and second bevels provided for reducing the stress received by the rounded portions, and a third bevel provided for preventing contact of one link plate with a second link plate in an adjacent link plate set when the link sets pivot.

3. An endless transmission belt according to claim 2, wherein the width of the horizontal portions of each of said link plates that are formed with said first and second cutouts is equal to or slightly smaller than the width of the portions of the link plate that are formed with the side end faces.

* * * * *

UNITED STATES PATENT AND TRADEMARK OFFICE
CERTIFICATE OF CORRECTION

PATENT NO. : 4,898,568

DATED : February 6, 1990

INVENTOR(S) : SAKAKIBARA et al

It is certified that error appears in the above-identified patent and that said Letters Patent is hereby corrected as shown below:

IN THE ABSTRACT:

Line 6, before "pins" insert --engaged by the--.

IN THE SPECIFICATION:

Column 1, line 41, after "4" insert --which passes--.

Signed and Sealed this

Eighth Day of January, 1991

Attest:

HARRY F. MANBECK, JR.

*Attesting Officer*    *Commissioner of Patents and Trademarks*